April 29, 1958 A. H. DICKINSON 2,832,542
CONTROL OF ELECTRONIC REGISTER
Filed Feb. 9, 1954 3 Sheets-Sheet 1

INVENTOR.
ARTHUR H. DICKINSON
HIS ATTORNEYS.

April 29, 1958
A. H. DICKINSON
2,832,542
CONTROL OF ELECTRONIC REGISTER
Filed Feb. 9, 1954
3 Sheets-Sheet 2
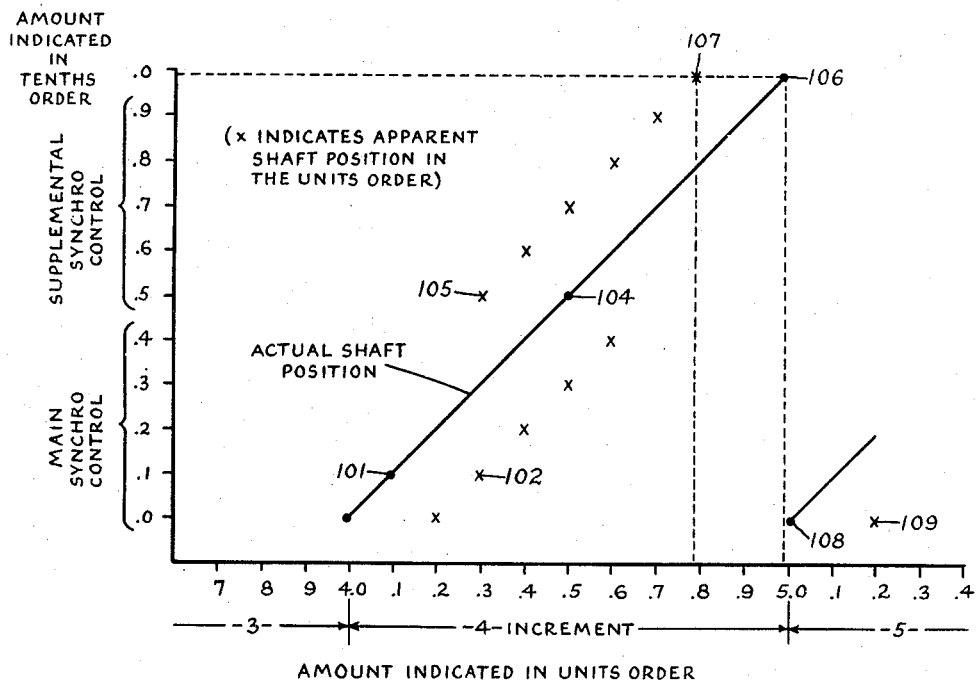
FIG.5.
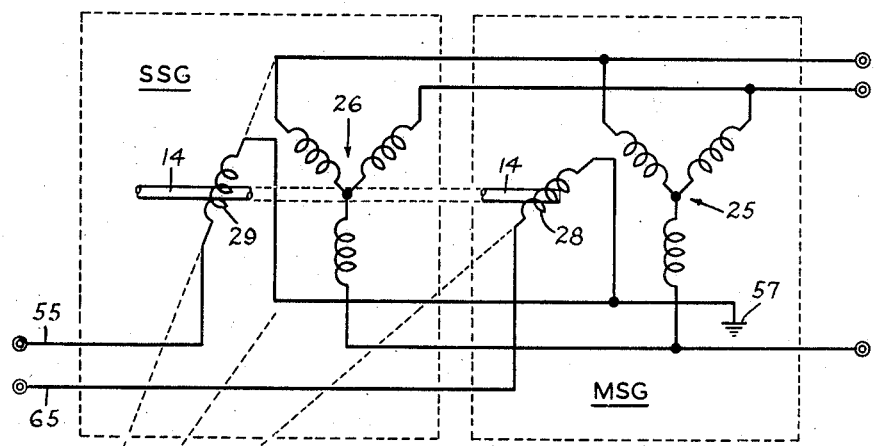
FIG.2.
INVENTOR.
ARTHUR H. DICKINSON
BY
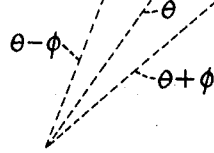
HIS ATTORNEYS.

April 29, 1958  A. H. DICKINSON  2,832,542
CONTROL OF ELECTRONIC REGISTER
Filed Feb. 9, 1954  3 Sheets-Sheet 3
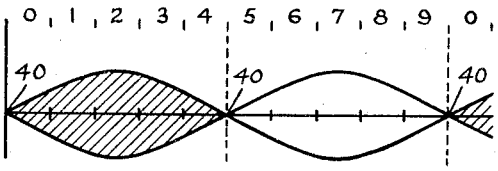
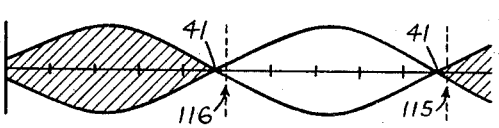
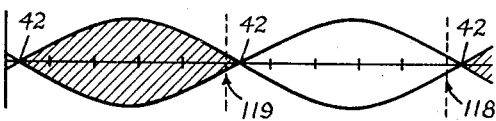
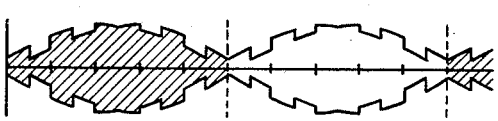
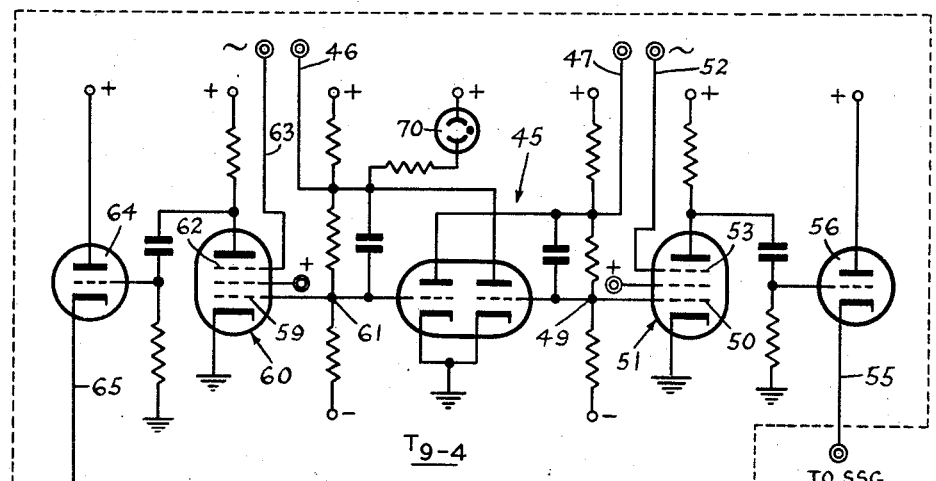
FIG. 3.
INVENTOR.
ARTHUR H. DICKINSON
BY
HIS ATTORNEYS.

United States Patent Office 2,832,542
Patented Apr. 29, 1958

2,832,542
CONTROL OF ELECTRONIC REGISTER

Arthur H. Dickinson, Greenwich, Conn., assignor to International Business Machines Corporation, New York, N. Y., a corporation of New York Application February 9, 1954, Serial No. 409,181

7 Claims. (Cl. 235—103)

The present invention relates to electronic register or counter apparatus and, more particularly, to novel and improved electronic counter means responsive to the movement of a physical member having a continuous variable motion.

Electro-mechanical and mechanical geared type counters are widely used in measuring the rotational movements of rotating shafts, and the like, in present day industrial equipment. The individual denominational orders of this type of counter are usually separately controlled by a series of shafts successively geared to one another in ratios corresponding to their numerical orders. Some counters of this type employ mechanical gear trains and linkages to couple the rotating shafts to the counting or register apparatus associated with the individual denominational orders. On the other hand, some electronic counters of this type utilize various forms of servo-mechanisms to couple the individual denominational orders to the rotating shafts.

Counters of this type are subject to a serious disadvantage commonly termed "ambiguity." This ambiguity may result from a slight misalignment of intergeared shafts, gear backlash, or inherent inaccuracies in the servo-mechanisms. The following numerical series is an example of the type of ambiguity that may occur in the abovementioned counters: 49.8, 49.9, 40.0, 50.0, 50.1, etc. In this example, when the tenths and units denominational orders changed from their 9 digits to their 0 digits, the tens denominational order lagged behind and still registered a 4 instead of a 5. Thus an error of 10.0 was registered in response to an actual increase of 0.1 in the count. Other types of ambiguity may include the actual omission of numbers in a counting series.

Conventional electronic counters are also subject to a further disadvantage, in that the denominational counting orders responsive to the number of complete revolutions made, for example, by a rotating shaft must be reset to 0 or to some other predetermined value after a power failure or stoppage. Thus these counters must be continuously operative and are not adaptable to periodic or sporadic checks of the rotational position of the rotating shaft with respect to the number of revolutions completed thereby.

It is, therefore, an object of the invention to provide novel and improved register or counter apparatus that is not subject to the aforementioned disadvantages.

Another object of the invention is to provide a novel and improved counter or register apparatus wherein the indication is at all times within a least increment of the true position of the physical member, whose motion is being measured.

A further object is to provide an electronic counter capable of manifesting the relative position of a physical member without benefit of resetting operations upon the application of power to the device.

In accordance with the invention, an electronic counter or register apparatus is provided wherein the individual denominational orders of the counter are respectively coupled by servo-mechanisms to a series of shafts successively geared to one another in ratios corresponding to their numerical orders. These shafts are coupled to and driven by the rotating shaft or like member whose rotational movement is being measured. Each of the denominational orders of the counter, except for the lowest denominational order, has stages individually operated by dual means selectively controlled from the next lower denominational order in response to the value registered by the next lower order to provide a continuous non-linear carry so as to positively control the position of the higher order index.

For a complete understanding of the invention, reference may be had to the following detailed description of an exemplary embodiment of the invention taken in conjunction with the accompanying drawings, in which:

Fig. 2 is a detailed electrical circuit diagram of the elements SSG and MSG in any of the denominational orders with the exception of the lowest;

Fig. 3 is a detailed electrical circuit diagram of the element $T_{9-4}$ in any of the denominational orders, with the exception of the highest;

Figs. 4, 4A, 4B and 4C are graphical representations of the envelopes of typical error voltages (RMS values) present in various elements in the system, in response to different increments of shaft rotation; and Fig. 5 is a graph showing the correspondence of actual shaft position as indicated by a lower order and apparent shaft position as indicated by the next higher denominational counting order.

Figure 1:
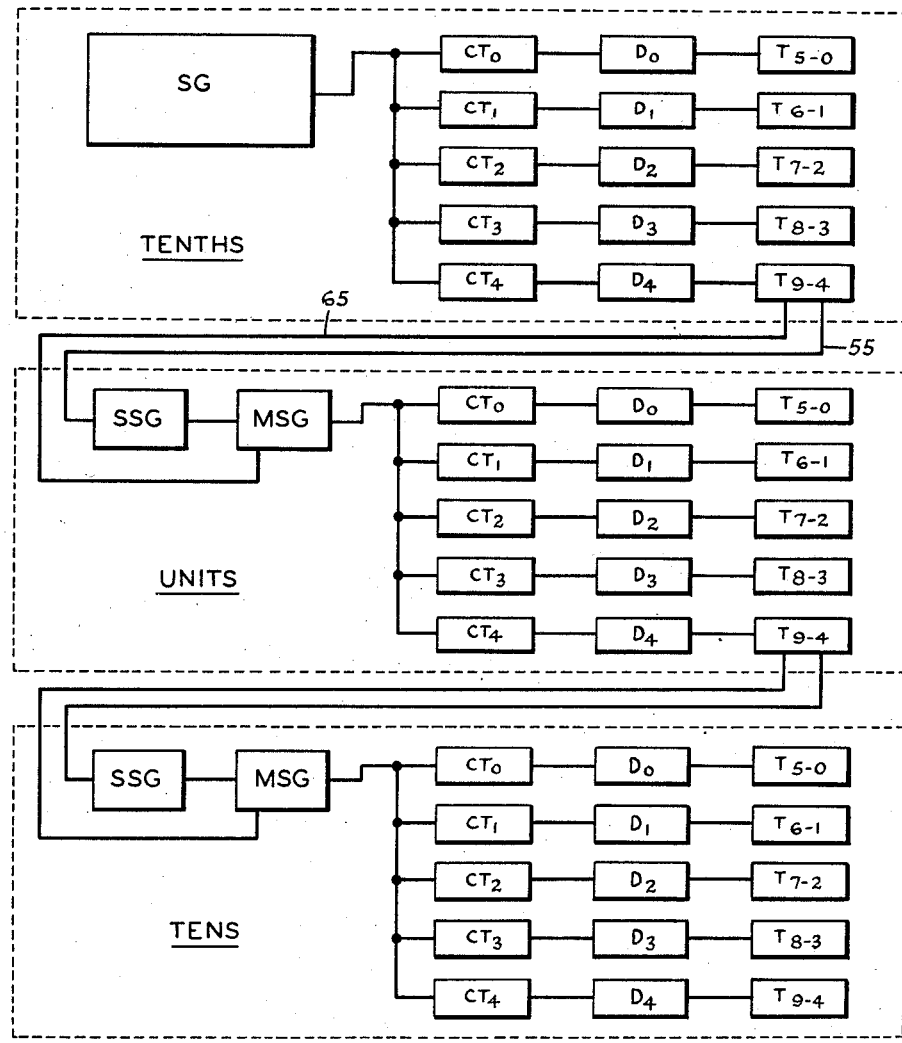
Figure 1 is a block diagram of an exemplary embodiment of the invention having three denominational orders.

Referring now to Fig. 1, the three denominational counting orders shown therein are designated Tenths, Units and Tens. Although only three denominational orders are referred to in the following description, it will be apparent that this description will be equally applicable to any desired number of denominational orders and to the operation of a counter or register utilizing any other suitable notational system, instead of the decimal notational system utilized herein.

Each of the denominational orders may include a servo-mechanism and associated counting apparatus such as disclosed in the copending U. S. application Serial No. 400,899, filed December 29, 1953, by A. H. Dickinson. More particularly, the Tenths denominational order may include a synchro generator SG coupled to a plurality of synchro control transformers $CT_0$ through $CT_4$. Each of the five synchro control transformers $CT_0$—$CT_4$ may include a rotor-secondary locked in a different respective axial position angularly displaced from each of the others by equal increments within a half revolution.

The synchro generator SG may be driven by a shaft 10 (in Fig. 1A) coupled through a coupling means 11 to a rotating shaft, or the like, 12, whose rotational movement is to be measured. The rotation of the shaft 10, in response to the rotation of the shaft 12, produces a corresponding rotational movement of a rotor in the synchro generator SG. This rotational movement of the rotor of the synchro generator SG causes the so-called "error voltages" in the rotor-secondaries of the synchro control transformers $CT_0$—$CT_4$ to vary in a well-known manner. Such a variation is illustrated in Fig. 4. For a detailed disclosure as to how this error voltage is produced, reference may be had to article 6, chapter 12, of "Principles of Radar," second edition, MIT Radar School Staff, 1946.

Since the rotor-secondaries in each of the synchro control transformers $CT_0$—$CT_4$ are angularly displaced by equal increments, the RMS envelopes of these error voltages are phase displaced from each other, so that the null points of the error voltages in succeeding control transformers define specific increments of shaft rotation. As shown in Fig. 4, the error voltage is in-phase (unshaded envelope) with the voltage across the rotor of the synchro generator SG for 180° of shaft rotation and out-of-phase (shaded envelope) for the remaining 180° of shaft rotation.

Phase discriminators $D_0$—$D_4$ are each associated respectively with a corresponding one of the synchro control transformers $CT_0$—$CT_4$ and function to provide signals indicative of the phase relation between the error voltage and the voltage across the rotor of the synchro generator SG. These signals are then used to control the stability condition of a specific counting element.

The counting elements $T_{5-0}$ through $T_{8-3}$ may take any suitable form. For example, they may comprise either of the alternative embodiments disclosed in the aforementioned copending Dickinson application. The counting element $T_{9-4}$ of the Tenths denominational order preferably may take the form shown in Fig. 3. The counting element $T_{9-4}$ has alternate conditions corresponding to the alternate conditions of the other counting elements $T_{5-0}$ through $T_{8-3}$. However, it also has certain additional important functions which will be discussed later.

Since the rotational motion of the shaft 10 corresponds directly to that of the shaft 12 which is being measured, the value indicated by the counting elements $T_{5-0}$ through $T_{9-4}$, inclusive, of the Tenths order indicates the shaft's position relative to the respective fractional increments of a complete revolution.

All of the higher denominational orders, in this case the Units and Tens orders, are substantially identical with the above-disclosed Tenths order, with the following exceptions: each of the higher orders have dual synchro generators, i. e., a main synchro generator MSG and a supplemental synchro generator SSG, and all but the highest denominational order may utilize a circuit such as shown in Fig. 3 for the counting element $T_{9-4}$. In the latter case, the counting element $T_{9-4}$ may be identical to the other counting elements $T_{5-0}$ through $T_{8-3}$ in its denominational order.

Figure 1A:
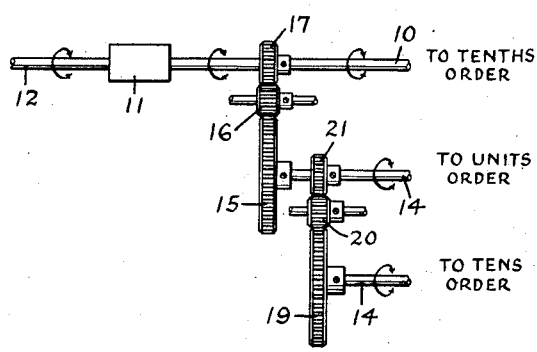
Fig. 1A is a schematic diagram representative of a typical gear train by which the individual denominational orders of Fig. 1 may be coupled to a rotating shaft, in accordance with the invention.

The rotors in the dual synchro generators MSG and SSG may each be connected to the same shaft 14, or to separate shafts coupled for corresponding movement. As shown in Fig. 1A, the shaft 14 associated with the synchro generators MSG and SSG of the Units order has a spur gear 15 mounted thereon, which is coupled through an idler gear 16 to a pinion gear 17 mounted on the shaft 10 associated with the Tenths denominational order. The ratio between the spur gear 15 and the pinion gear 17 is selected in accordance with the notational system utilized by the counter. In this exemplary embodiment, since the decimal notational system is employed, the spur gear 15 and the pinion gear 17 are in a 10:1 ratio. Thus the shaft 14 associated with the Units order makes one complete revolution for every ten complete revolutions of the shaft 10 associated with the Tenths order. Similarly, the shaft 14 associated with the synchro generators MSG and SSG of the Tens order has a spur gear 19 mounted thereon, which is coupled through an idler gear 20 to a pinion gear 21 mounted on the shaft 14 associated with the Units order. The spur gear 19 and the pinion gear 21 are also in a 10:1 ratio.

In Fig. 2, the Y wound secondaries 25 and 26 of the synchro generators MSG and SSG, respectively, are connected in parallel and are coupled to their associated synchro control transformers $CT_0$—$CT_4$ in the same manner as the single synchro generator SG of the Tenths order is coupled to its synchro control transformers $CT_0$—$CT_4$. The rotor 28 of the main synchro generator MSG and the rotor 29 of the supplemental synchro generator SSG are each mounted on the shaft 14 in a plane normal to the axis of the shaft 14.

However, the rotors 28 and 29 are not axially aligned with the rotor in the synchro generator SG of the Tenths or lowest order, which is designated by the position indicating line $\theta$. The rotor 28 of the main synchro generator MSG is angularly displaced in a leading position $(\theta+\phi)$ relative to the position $\theta$ of the rotor for the synchro generator SG. The rotor 29 of the supplemental synchro generator SSG is angularly displaced in a lagging position $(\theta-\phi)$ relative to the position $\theta$ of the rotor in the synchro generator SG. Thus the axial position of the rotor 28 leads the rotor in the synchro generator SG of the Tenths or lowest order by a fixed angle $\phi$ and the rotor 29 lags by a fixed angle $\phi$. The angle $\phi$ may have any suitable value. However, in the preferred embodiment, an angle of 7.2° has been found satisfactory.

Let us now consider the effect of the circuit arrangement of Fig. 2 in view of the error voltage envelopes illustrated in Figs. 4, 4A and 4B. In Fig. 4, the error voltage envelope for the control transformer $CT_4$ has node points 40 between the in-phase and out-of-phase components which occur exactly on the indices or imaginary dividing lines between the 9 and 0, and 4 and 5 increments of rotation of the rotating shaft 10 associated with the Tenths order.

In Fig. 4A, the envelope for the control transformer $CT_4$ for the Units order has node points 41 in response to the energization of only the rotor 28 of the main synchro generator MSG. It is seen that the node points 41 do not fall on the indices between the 9 and 0, and 4 and 5 increments, but actually lead these indices and occur at points well into the 9 and 4 increments. In contrast to the leading position of the node points 41 when the rotor 28 in the main synchro generator MSG is energized by itself, Fig. 4B shows that the node points 42 of the envelope produced by energization of the supplemental synchro generator SSG by itself are seen to lag and fall well into the 0 and 5 increments.

In order to simplify the disclosure, the conventional heating circuits for the various electron discharge devices of the apparatus of Fig. 3 are omitted, suitable sources of positive plate potential are designated by terminals with a (+) sign, and suitable sources of negative biasing potential are designated by terminals with a (—) sign.

Let us now consider how the synchro generators MSG and SSG are selectively controlled in response to values indicated by the next lower denominational order. In Fig. 3, the counting element $T_{9-4}$ may include a conventional double-stability trigger circuit 45 which is adapted to have its stability condition controlled by its associated phase discriminator $D_4$ as a result of voltages appearing on conducting means 46 and 47. More particularly, when the phase relation detected by the phase discriminator $D_4$ is "in-phase," the potential on the conducting means 46 is at the lesser of two operating values and the potential on the conducting means 47 is at the higher of two operating values, so that the right hand triode section of the trigger circuit 45 is conducting. In response to an "out-of-phase" condition, the potential on the conducting means 46 is at the higher of the two values and the potential on the conducting means 47 is at the lower of the two values, so that the left hand triode section of trigger circuit 45 is conducting. Thus the trigger circuit 45 is On in response to an in-phase condition and Off in response to an out-of-phase condition.

When the trigger circuit 45 is On, the point 49 is at the more positive of two operating potentials and the control grid 50 of a pentode-type electron discharge device 51 coupled thereto is at its zero bias potential. Under these conditions, the pentode device 51 acts as a gating tube and passes an alternating current signal to the supplemental synchro generator SSG of the next higher denominational order. This may be accomplished by means of a suitable source of alternating current energy (not shown) being coupled through a conducting means 52 to a suppressor grid 53 in the pentode device 51. When the pentode 51 is enabled by means of the zero bias condition of the control grid 50, an alternating current signal appears in a conducting means 55 included in the cathode output circuit of a triode-type electron discharge device 56 which is capacitively coupled to the output of the pentode 51. The conducting means 55 may be connected to one terminal of the rotor 29 in the supplemental synchro generator SSG. The other terminal of the rotor 29 is connected to a ground 57 or other suitable reference point. When the double-stability trigger circuit 45 is in its Off condition, the potential of the point 49 is at the less positive of its two operating potentials and the control grid 50 of the pentode 51 is biased beyond cut off, thereby deenergizing the rotor 29.

Similarly, a control grid 59 of a pentode-type electron discharge device 60 may be connected to a point 61 in the double-stability trigger circuit 45. The pentode device 60 may have a suppressor grid 62 connected by a conducting means 63 to the source of alternating current energy and the output of the pentode 60 may be capacitively coupled through a triode-type electron discharge device 64 to a conducting means 65 in the cathode output circuit of the triode 64, leading through the rotor 28 of the main synchro generator MSG to the ground 57.

In contrast to the point 49, the potential of the point 61 in the trigger circuit 45 is at the more positive of two operating potentials when the trigger circuit 45 is in its Off condition and at its less positive potential when the trigger circuit 45 is in its On condition. The more positive of the two potentials at the point 61 is sufficient to cause the control grid 59 of the pentode 60 to be in its zero bias condition, whereas, the less positive of the two potentials biases the control grid 59 of the pentode 60 below cut off. Therefore, the rotor 28 of the main synchro generator MSG is energized only when the trigger circuit 45 is in its Off condition (i. e., an "out-of-phase" condition) and rotor 29 of the supplemental synchro generator SSG is energized only when the trigger circuit 45 is in its On condition (i. e., an "in-phase" condition).

From Fig. 4, it is seen that the error voltage in the control transformer $CT_4$ for the Tenths order is out-of-phase with respect to the reference voltage across the rotor of the synchro generator SG during the 0 to 4 increments of shaft rotation and in-phase during the 5 to 9 increments of shaft rotation. Therefore, the rotor 29 of the supplemental synchro generator SSG of the next higher or Units order will be energized through the 0 to 4 increments of rotation of the shaft 10 connected to the Tenths order and the rotor 28 of the main synchro generator MSG will be energized through the 5 to 9 increments of rotation of the shaft 10.

Accordingly, an error voltage envelope such as shown in Fig. 4C will be produced in the synchro control transformer $CT_4$ of the Units order. From an inspection of this voltage envelope, it is evident that a significant RMS voltage value is present at all times and that there is no chance of any ambiguity resulting from the shaft stopping on a null point, since none are present. Thus a positive control is exerted at all times upon the value manifested by the Units order.

The main synchro generator MSG and the supplemental synchro generator SSG of the next higher or Tens order are directly controlled from the counting element $T_{9-4}$ of the Units order in exactly the same manner. It will be apparent that any number of higher orders may be positively controlled from their respective next lower orders in the same manner.

This dual type of control causes the value of shaft rotation that is manifested by the higher denominational orders to be an "apparent" value in contrast to the actual value indicated in the lowest denominational order. When the rotating shaft 12, whose rotational motion is being measured, has completed exactly 4.1 revolutions, as indicated by point 101 in Fig. 5, the shaft will be positioned on the dividing line between the 0 and 1 increments of rotation of the shaft 10 associated with the Tenths denominational order. Thus, as shown in Fig. 4, the error voltage in the control transformer $CT_4$ of the Tenths order will be out-of-phase with the voltage across the rotor in the synchro generator SG and the double-stability trigger circuit 45 in the counting element $T_{9-4}$ will be in its Off condition. Under these circumstances, the rotor 28 of the main synchro generator MSG in the Units order will be energized. Since the axial position of the rotor 28 leads that of the rotor in the synchro generator SG by the angle $\phi$, the apparent shaft position indicated in the Units order will lead the actual shaft position by a significant amount, e. g., an apparent position at point 102 with a value of 4.3 in contrast to the actual value of 4.1 at point 101.

As the actual shaft position changes from 4.1 to 4.4, the apparent position of the shaft as indicated in the Units order continues to lead the actual shaft position. However, when the position of the shaft passes from the 4 increment to the 5 increment of the Tenths order, the error voltage in the control transformer $CT_4$ assumes an in-phase condition.

As a result of this change in phase, the rotor 28 of the main synchro generator MSG in the Units order is deenergized and the rotor 29 of the supplemental synchro generator SSG is energized. Since the axial position of the rotor 29 in the supplemental synchro generator SSG lags that of the rotor in the synchro generator SG by the angle $\phi$, the apparent shaft position indicated in the Units order switches from a leading value to a lagging value. For example, when the actual shaft position is at point 104 with a value of 4.5, the apparent shaft position indicated in the Units order is at point 105 with a value of 4.3.

As the actual shaft position passes through the 5 to 9 increments of the Tenths order, the apparent shaft position indicated in the Units order continues to lag the actual shaft position by a fixed amount until the actual shaft position reaches a point 106, an infinitely small angular distance from 5.0. At that point the indicated shaft position in the Units order would be at point 107 with an approximate value of 4.79 well into the 4 increment. However, when the shaft rotates the remaining finite amount to point 108 with a value of 5.0, it passes from the 9 increment to the 0 increment of the Tenths order, and the trigger circuit 45 in the counting element $T_{9-4}$ of the Tenths order switches to its Off condition. Thus the rotor 29 in the supplemental synchro generator SSG is deenergized and the rotor 28 of the main synchro generator MSG is energized. This causes the apparent indicated shaft position in the Units order to be at point 109 with a value of 5.2 well into the 5 increment. From this it is seen that the actual rotation of the shaft for an infinitely small amount causes the apparent position as indicated by the Units order to move .4 revolution, thereby by-passing the null point and eliminating a cause for ambiguity.

The reverse of the foregoing is also true. For example, as the measured shaft is rotated reversely a finite movement would change its status from 5.0 to 4.9 revolutions. In the Units order, control would shift from the main synchro generator MSG to the supplemental synchro generator SSG under the control of the Tenths order. Thus a large reverse shift in the apparent index is provided in the same manner as described for the forward rotation.

The value of the shifting of this apparent index is more obvious in relation to higher counter orders. For example, as the shaft 12 rotates from a count of 49.8 to 49.9 there is relatively little rotation of the Tens order, i. e., 1 increment rotation of the measured shaft 12 results in a rotation of 36° for the shaft 10 associated with the Tenths order, 3.6° rotation of the Units order shaft 14 and 0.36° rotation of the Tens order shaft 14. In terms of minutes, for one increment of rotation of the measured shaft 12, the Tens order shaft rotates 21.6 minutes. A theoretical hundreds order would rotate 2.16 minutes and a theoretical thousands order shaft would rotate 0.216 minute. In the theoretical thousands order, the difference between, say 4999.9 and 5000.0, represents 0.216 minute rotation of its shaft. This borders on the limits of practicability in both the mechanical structures of the geared shafts as well as in the electronic accuracy of the synchro devices.

Reliance on such small incremental changes for counter order control is eliminated in the instant device by reference being made to the next lower order. For a change in shaft position of from 4999.9 revolutions to 5000.0 revolutions, the highest order shaft rotates only 0.216 minute. This is an almost indistinguishable change as far as counter operation is concerned. However, as the hundreds denominational order changes from 9 to 0, the control for the thousands order changes from the supplemental synchro generator SSG back to the main synchro generator MSG. Assume that the rotor 29 of the supplemental synchro generator SSG is oriented on its shaft in such a way that it is retarded 7.2° from the true index as determined by the rotor of the synchro generator SG of the Tenths order and that the main synchro generator MSG is advanced 7.2° from the true index. For all practical purposes the thousands order shaft can be said to be on the true index when the hundreds order contains a 9, since the thousands order shaft requires 7.2° further rotation to cause the rotor 29 of the supplemental synchro generator SSG to produce a theoretical null. However, as the hundreds order switches its status from 9 to 0, control is changed from the supplemental synchro generator SSG to the main synchro generator MSG. Since the main synchro generator MSG has its rotor 28 advanced on the thousands order shaft by 7.2°, the effect of switching from 7.2° on one side of the null point to a position 7.2° beyond the null point is created. Thus for an actual shaft rotation of 0.216 minute in the thousands order, the effect of 14.4° rotation is produced through switching of the dual control circuits.

Another important feature of the present invention is that no resetting operation is required prior to effecting a measurement. As is now understood, a null condition wherein a zero error voltage envelope exists is eliminated in all but the lowest denominational order. Since each counting element in the different denominational counting orders is positively controlled as to its status by means of the error voltages present in the output of its associated synchro control transformer, a mode of operation is possible in which the A. C. and D. C. power may be shut off except during those intervals in which a reading of the shaft position is desired. The filament power, of course, must remain on unless a sufficient time lag is provided for warm-up periods prior to effecting a reading.

Visual indicating means, for example, a conventional glow discharge device 70 as shown in Fig. 3, may be associated with each of the counting elements in each of the denominational orders, so that, if the measured shaft is stationary or nearly so at the moment a reading is desired to be taken, the reading may be taken visually. For high speed operation, in the event a reading is desired while the shaft is in motion, any of several well-known readout means may be employed. Through the action of additional conventional electronic circuits the instantaneous value may be stored for future use or may be employed directly to effect the operation of a punch, relay bank, etc.

When a reading is desired and the A. C. and D. C. power is applied to the counter, an immediate indication of the measured shaft position is obtained through observation of the visual indicating means associated with the individual counting elements in each of the denominational orders. The indication is at all times within a least increment of the true shaft position.

Let us assume that the shaft 12 is precisely at 50.0 revolutions. The error voltage envelope (Fig. 4) in the control transformer $CT_4$, therefore, is at a null point 40 between the 9 and 0 increments of shaft rotation. Since no lower denominational order is available for reference, a dual control means is not provided in the Tenths order. Therefore, since no error voltage is generated in the rotor-secondary of the control transformer $CT_4$, the counting element $T_{9-4}$ in the Tenths order may assume either an On or Off status, when the power is applied to the counting device.

First let us assume that the counting element $T_{9-4}$ selects the Off status upon the application of power. The counter indication for the Tenths order would then be 0. With the counting element $T_{9-4}$ of the Tenths order in its Off position, the Units order is under the control of its main synchro generator MSG.

The Units order shaft 14 is also precisely at the zero index position. However, since control now stems from the main synchro generator MSG, Fig. 4A represents the error voltage in effect in the synchro control transformer $CT_4$ of the Units order. It is seen that, for the position 115 at the index or dividing line between the 9 and 0 increments in Fig. 4A, a substantial out-of-phase error voltage exists in the control transformer $CT_4$ for the Units order. This out-of-phase error voltage positively adjusts the counting element $T_{9-4}$ of the Units order to its Off condition. Thus a 0 counter indication is insured for the Units order.

The Tens order shaft 14 is precisely at the 5 index point. Since the value in the Units order is zero ($T_{9-4}$ in its Off condition), the Tens order is also under the control of its main synchro generator MSG. From an inspection of Fig. 4A, it will be seen that the error voltage envelope at the point 116 has a substantial in-phase value. Thus the counting element $T_{9-4}$ in the Tens order is positively adjusted to the On status to provide a counter indication of 5 for this order. Accordingly, when the Tenths order counting element $T_{9-4}$ indiscriminately assumes the Off status upon the application of power, the counter indicates 50.0 revolutions as the correct shaft position.

Now suppose that the control element $T_{9-4}$ in the Tenths order assumes the On status when the power is applied, and the counter indication for the Tenths order is 9. Control of the Units order is then through the operation of the supplemental synchro generator SSG and the error voltage envelope shown in Fig. 4B is generated in the synchro control transformer $CT_4$ of the Units order. From an inspection of the point 118 in Fig. 4B corresponding to the point 115 in Fig. 4A, it is seen that a substantial in-phase error voltage is generated in the control transformer $CT_4$ of the Units order. The counting element $T_{9-4}$ in the Units order, therefore, is adjusted to the On status and the value manifested by this order is 9.

Since the counting element $T_{9-4}$ in the Units order is now On, the error voltage envelope shown in Fig. 4B is also generated in the synchro control transformer $CT_4$ for the Tens order. Therefore, a substantial out-of-phase error voltage is generated at the point 119 corresponding to the point 116. Thus the counting element $T_{9-4}$ in the Tens order is adjusted to the Off status and the Tens order manifests a 4. Accordingly, when the Tenths order counting element $T_{9-4}$ indiscriminately assumes the On status upon the application of power, the counter indicates 49.9 revolutions as the shaft position, this being within one increment of the true shaft position.

Thus there has been provided, in accordance with the invention, a novel and improved electronic counter or register apparatus, which is always accurate within a least increment and which is adaptable to sporadic or periodic checks as to the position of a physical member, whose position is being measured, while the power is maintained shut Off except during the measuring periods.

It will be obvious to those skilled in the art that the above disclosed embodiment is meant to be merely exemplary and that it is susceptible of modification and variation without departing from the spirit and scope of the invention. For example, any suitable type of conventional gating means could be used to selectively control the passage of alternating current energy to the dual synchro control generators MSG and SSG. Accordingly, it will be evident that the invention is not deemed to be limited except as defined by the appended claims.

I claim:

1. Electrical counting apparatus having at least two different denominational counting orders for manifesting a multi-denominational value, comprising ordered means for producing in each order a plurality of continuous signals respectively of at least one different instantaneous characteristic representative of different digital values of the respective order, means in each of said orders for manifesting the different digital values, and non-interrupted means interconnecting different orders of said ordered means for modifying at all times said plurality of continuous signals in one order as a function of the digital value manifested by the ordered means of the next lower denominational order.

2. Electrical counting apparatus having at least two different denominational counting orders for manifesting a multi-denominational value, comprising ordered means for producing in each order a plurality of continuous signals respectively of at least one different instantaneous characteristic representative of different digital values of the respective order, means in each of said orders for manifesting the different digital values, selectively operable means in at least one of said orders for causing said plurality of continuous signals to be at all times representative of apparent digital values either somewhat greater than or somewhat less than the true digital value at that time, and non-interrupted means responsive to the digital value manifested by the ordered means of the next lower denominational order to at least one of said orders for operating said selectively operable means to cause said plurality of continuous signals to be in one or the other of the alternate conditions.

3. Electrical counter apparatus including at least two different denominational counting orders, the higher order of said two denominational counting orders comprising dual synchro generator means, a rotatable shaft, a synchro control transformer coupled to said dual synchro generator means for producing an error voltage signal representative of the rotational position of said shaft, counting means associated with said synchro control transformer for producing a counting indication representative of the rotational position of said shaft, said dual synchro generator means having a first rotor connected to said rotatable shaft with the axial position of said first rotor being angularly displaced from a predetermined zero position in one direction and a second rotor connected to said rotatable shaft with the axial position of said second rotor being angularly displaced from said predetermined zero position in an opposite direction, and means responsive to the counter indication manifested by the lower order of said two denominational counting orders for selectively energizing said first rotor and deenergizing said second rotor, and energizing said second rotor and deenergizing said first rotor.

4. Electrical counter apparatus including at least two different denominational counting orders, the higher one of said two denominational counting orders comprising dual synchro generator means, a rotatable shaft, a plurality of synchro control transformers coupled to said dual synchro generator means, each of said synchro control transformers having a rotor-secondary and having the axial position of said rotor-secondary angularly displaced from a predetermined zero position at a different respective fractional increment of a half revolution from said predetermined zero position so that said synchro control transformers produce a plurality of different error voltage signals representative respectively of the rotational position of said shaft relative to different fractional increments of a complete revolution, discriminator means for determining the phase relation of each of said error voltage signals with respect to a given voltage signal, counting means associated with each of said synchro control transformers and responsive to the phase relation of said plurality of error voltage signals with respect to said given voltage signal as determined by said discriminator means, said dual synchro generator means having a first rotor connected to said rotatable shaft with the axial position of said first rotor being angularly displaced from said predetermined zero position in one direction and a second rotor connected to said rotatable shaft with the axial position of said second rotor being angularly displaced from said predetermined zero position in an opposite direction, and means responsive to the count manifested by the lower one of said two denominational counting orders for selectively energizing said first rotor and deenergizing said second rotor, and energizing said second rotor and deenergizing said first rotor.

5. In an electrical counting apparatus having at least two different denominational counting orders wherein the operation of the higher one of the counting orders is controlled by the counter indication manifested by the lower order, the combination of a source of alternating current energy, a first and a second synchro generator means in said higher order, and means in said lower order for selectively energizing said first and said second synchro generator means from said source.

6. In an electrical counting apparatus having at least two different denominational counting orders wherein the operation of the higher one of the counting orders is controlled by the counter indication manifested by the lower order, the combination of a source of alternating current energy; a first and a second synchro generator means in said higher order; a counting element in said lower order including a first gating means for controlling the energization of said first synchro generator means by said source, a second gating means for controlling the energization of said second synchro generator means by said source, and double-stability trigger circuit means for selectively enabling said first and said second gating means.

7. In an electrical counting apparatus having at least two different denominational counting orders wherein the operation of the higher one of the counting orders is controlled by the counter indication manifested by the lower order, the combination of a counter element in said lower order including a double-stability trigger circuit having On and Off stability conditions and first and second gating means, a source of alternating current electrical energy, dual synchro generator means in said higher order including a pair of rotors whose respective axial positions are angularly displaced in opposite directions from a predetermined zero position, and means whereby a first one of said pair of rotors is energized by said source of alternating current energy through said first gating means when said double-stability trigger circuit is in its On condition and a second one of said pair of rotors is energized through said second gating means when said double-stability trigger circuit is in its Off condition.

References Cited in the file of this patent

UNITED STATES PATENTS

| 2,646,926 | Young | July 28, 1953 |
| 2,685,082 | Beman et al. | July 27, 1954 |
| 2,692,814 | Mathes et al. | Oct. 26, 1954 |

OTHER REFERENCES

"Some Methods of Conversion of Data from Analogue (Shaft Rotation) to Digital Form" by Diprose; Royal Aircraft Establishment, Farnborough, March 1951.